(No Model.)
J. M. SZARKOWSKI.
SHOE FOR GRAIN DRILLS.
No. 452,245.  Patented May 12, 1891.
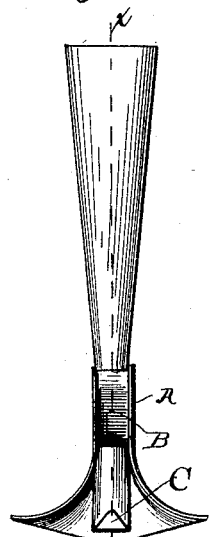
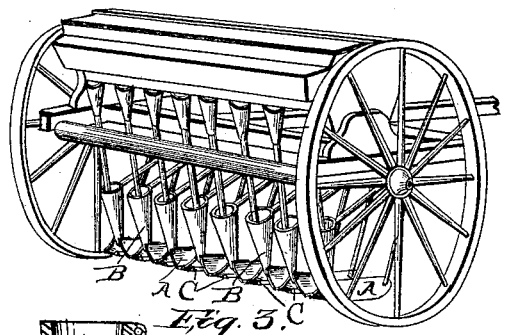
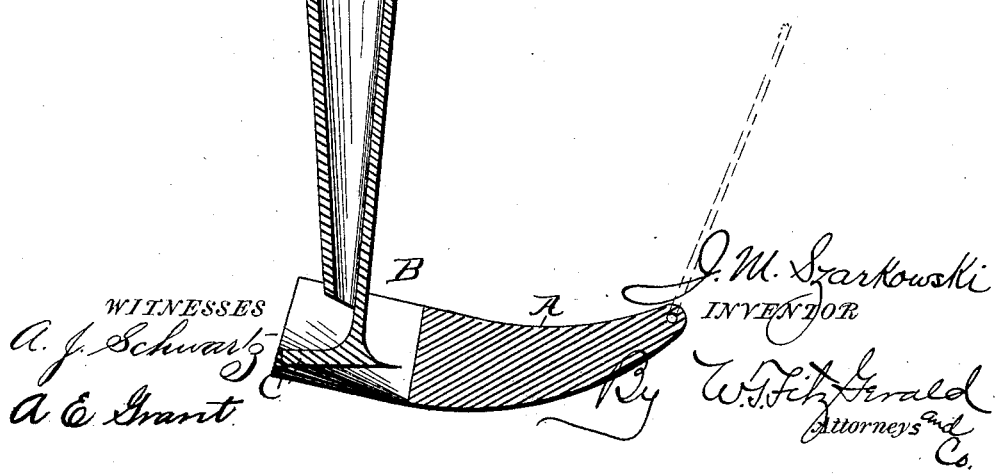
WITNESSES
A. J. Schwartz
A. E. Grant
J. M. Szarkowski
INVENTOR
By W. J. FitzGerald
Attorneys

UNITED STATES PATENT OFFICE.

JOHN M. SZARKOWSKI, OF MINTO, NORTH DAKOTA.

SHOE FOR GRAIN-DRILLS.

SPECIFICATION forming part of Letters Patent No. 452,245, dated May 12, 1891.

Application filed August 25, 1890. Serial No. 362,955. (No model.)

*To all whom it may concern:*

Be it known that I, JOHN M. SZARKOWSKI, a citizen of the United States, residing at Minto, in the county of Walsh and State of North Dakota, have invented certain new and useful Improvements in Press-Shoes for Grain-Drills; and I do hereby declare the following to be a full, clear, and exact description of the invention, such as will enable others skilled in the art to which it appertains to make and use the same.

My invention relates to improvements in press-shoes for grain and other drills, the object of which is to enable the grain to be properly distributed over the seed-bed that such seed may not be bunched in the bottom of the furrow.

Proceeding now to describe my invention, reference will be had to the accompanying drawings, in which—

Figure 1 is a rear elevation of my improved press-shoe. Fig. 2 is a perspective view thereof, while Fig. 3 is a vertical section on line $x$ $x$ of Fig. 2.

The great disadvantage now experienced in the use of press-shoes for grain or other drills of the usual construction is that the grain is usually deposited or bunched in the bottom of the furrow, so that when it begins to grow the interlacing of the roots thereof will have a tendency to smother or destroy many of the germs. Another disadvantage in having the grain thus bunched in the bottom of the furrow is that practically only a small portion of the soil is utilized, as the intervening space between the rows is left barren. I overcome all of these and other disadvantages and difficulties by so constructing the press-shoe that the grain will be distributed over the entire bottom of the furrow and thus enable the entire area of the soil to be used.

Proceeding now to describe in detail the various parts of my invention, A is the shoe proper, which is constructed in the usual manner, except that the rear end thereof, which terminates in two blades, is so shaped that the lower sides of said blades will be widely divergent from the line of the body proper, as shown in Fig. 1. The upper parts of the rear ends of the blade are brought near together and are secured to the sides of the shank B, which is somewhat elliptical in cross-section and very narrow at its point of connection with the ends of the blade. By thus making the shank quite narrow at said point of connection it will be seen that but very little soil is displaced when the shoe is in use and the small furrow thus made will be easily and naturally closed by the soil dropping back into place after the shoe has passed. The object of bending the lower sides of the rear ends of the blade is that the same shall be widely separated, thus making the bottom of the furrow a maximum width, so that the grain when falling through the shank will be scattered over the entire bottom of the furrow or seed-bed. In order to more effectively secure such scattering of the grain, I provide the spreader C, which is attached to the lower end of the shank and arranged to reach rearwardly to the rear end of the ends of the blade and on a line with the bottom thereof. The spreader is preferably triangular in cross-section, the apex forming the upper side, so that when the grain is falling thereon it will be effectively scattered upon either side, and thus caused to cover the entire bottom of the furrow, as will be readily understood. By thus spreading the lower sides of the rear ends of the blade the press-shoes may be caused to touch each other, if so desired, and thus provide practically one continuous line of seed-bed a proper distance under the surface of the soil.

I am aware that various kinds of press-shoes are in existence; but all of them with which I am familiar are so constructed that the seed-furrow is opened, thus rendering it impossible for the furrow to be closed without some special means is employed to effect such result. By making the shank narrow and elliptical I overcome the difficulty in thus making an unnecessarily wide furrow, thus producing a shoe that will readily "scour" and close its own furrow, and at the same time providing a maximum width of seed-bed for each shoe.

Believing that the advantages and operation of my invention will be readily apparent from the foregoing description, further reference to the same is deemed unnecessary.

Having thus described my invention, what I claim as new, and desire to secure by Letters Patent, is—

1. A press-shoe for grain and other drills, having the lower edges of the rear ends of the blade made widely divergent, while the upper edges thereof are brought closely together against the sides of the shank, the shank B, elliptical in cross-section and narrow at its point of contact with the blade, and the spreader secured to the lower end of the shank and reaching along the lower side and between the diverging ends of the blade, substantially as set forth.

2. The shank elliptical in cross-section, the flattened end of which is secured between the upper edges of the rear ends of the blade and having extending from its lower end the spreader-block, as set forth.

3. In a press-shoe for grain and other drills, the combination of the blade, the shank elliptical in cross-section and secured between the rear ends of the blade, and the spreader secured to the end of the shank and held so that the grain will be spread over the bottom of the furrow, all substantially as set forth, and for the purpose named.

In testimony whereof I affix my signature in presence of two witnesses.

JOHN M. SZARKOWSKI.

Witnesses:
   E. E. DAILY,
   THEODORE WYSOCKI.